United States Patent
Lyren

(10) Patent No.: US 11,330,389 B2
(45) Date of Patent: *May 10, 2022

(54) PLAYING BINAURAL SOUND CLIPS DURING AN ELECTRONIC COMMUNICATION

(71) Applicant: Philip Scott Lyren, Bangkok (TH)

(72) Inventor: Philip Scott Lyren, Bangkok (TH)

(*) Notice: Subject to any disclaimer, the term of this patent is extended or adjusted under 35 U.S.C. 154(b) by 0 days.

This patent is subject to a terminal disclaimer.

(21) Appl. No.: 17/100,892

(22) Filed: Nov. 22, 2020

(65) Prior Publication Data

US 2021/0076154 A1 Mar. 11, 2021

Related U.S. Application Data

(63) Continuation of application No. 16/747,517, filed on Jan. 20, 2020, now Pat. No. 10,848,898, which is a continuation of application No. 16/271,786, filed on Feb. 9, 2019, now Pat. No. 10,587,980, which is a continuation of application No. 15/883,039, filed on Jan. 29, 2018, now Pat. No. 10,251,014.

(51) Int. Cl.
| | |
|---|---|
| *H04S 7/00* | (2006.01) |
| *G06F 3/04817* | (2022.01) |
| *H04S 3/00* | (2006.01) |
| *G06F 3/0482* | (2013.01) |
| *H04M 1/7243* | (2021.01) |
| *H04M 1/02* | (2006.01) |
| *H04M 1/72433* | (2021.01) |
| *H04M 1/72442* | (2021.01) |

(52) U.S. Cl.
CPC ............ *H04S 7/303* (2013.01); *G06F 3/0482* (2013.01); *G06F 3/04817* (2013.01); *H04M 1/7243* (2021.01); *H04S 3/008* (2013.01); *H04S 7/302* (2013.01); *H04M 1/0202* (2013.01); *H04M 1/72433* (2021.01); *H04M 1/72442* (2021.01); *H04R 2460/13* (2013.01); *H04S 2420/01* (2013.01)

(58) Field of Classification Search
CPC ........ H04S 2420/01; H04S 7/30; H04S 1/007; G10L 19/167; G10L 19/20
See application file for complete search history.

(56) References Cited

U.S. PATENT DOCUMENTS

| | | | |
|---|---|---|---|
| 2003/0033214 A1* | 2/2003 | Mikkelsen | G06F 16/182 705/26.8 |
| 2015/0262586 A1* | 9/2015 | Furse | H04S 7/30 381/303 |

* cited by examiner

*Primary Examiner* — Kile O Blair

(57) ABSTRACT

A method plays sound clips in binaural sound to users during an electronic communication between two or more users. A processor convolves the sound clips with HRTFs so the sound externally localize away from a head of the user listening to the sound clip. The sound clips play to users during the electronic communication without transmitting the sound clips to electronic devices of the users.

20 Claims, 8 Drawing Sheets

Receive, during an electronic communication between a first user with a first electronic device and a second user with a second electronic device, a sound clip convolved with customized HRTFs to the first user or generic HRTFs and intended to be played to the second user.
500

Change or replace the sound clip convolved with the HRTFs from the first user with a sound clip convolved with customized HRTFs of the second user.
510

Play the processed or convolved sound clip to the second user with speakers so the sound externally localizes as binaural sound away from the head of the second user.
520

Figure 5

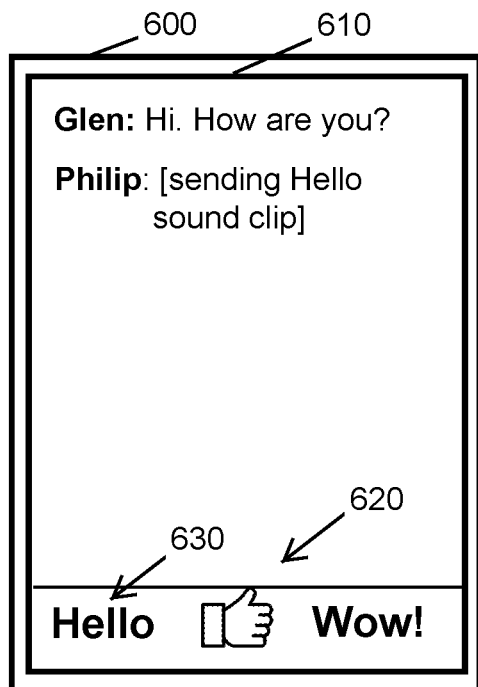

Figure 6A

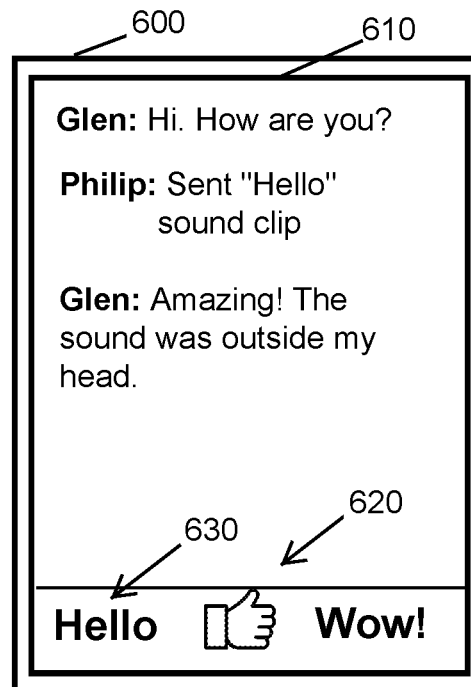

Figure 6B

PLAYING BINAURAL SOUND CLIPS DURING AN ELECTRONIC COMMUNICATION

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

BRIEF DESCRIPTION OF THE DRAWINGS

FIG. 5 is a method to change or replace a sound clip convolved with HRTFs for a user intended to listen to the sound clip in accordance with an example embodiment.

FIG. 6A is an electronic device with a display that displays sound clips in binaural sound during an electronic communication between two users in accordance with an example embodiment.

FIG. 6B is the electronic device and display of FIG. 6A in which a user sends a sound clip in binaural sound to another user during the electronic communication in accordance with an example embodiment.

SUMMARY

Figure 1:
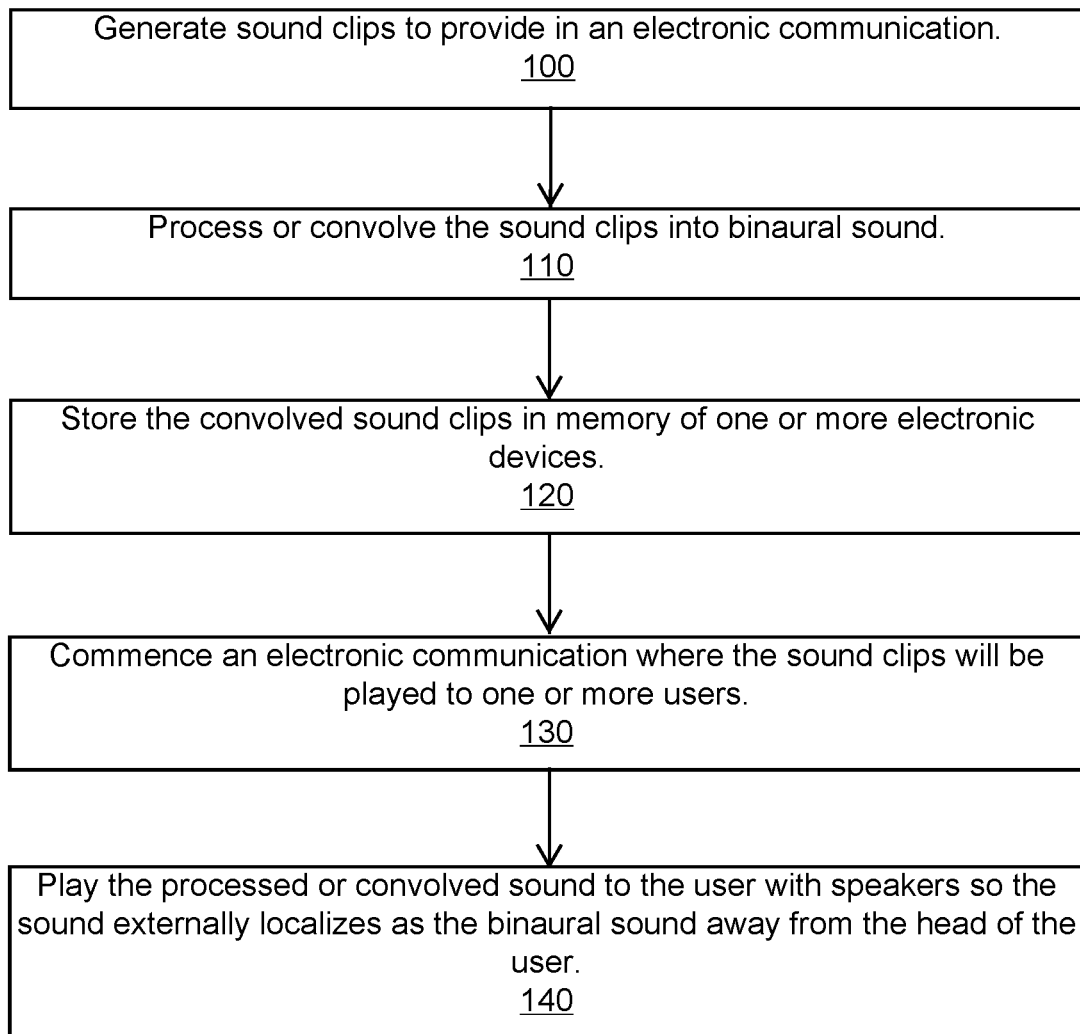
FIG. 1 is a method to play sound clips in binaural sound during an electronic communication between users in accordance with an example embodiment.

One example embodiment is a method or apparatus that plays sound clips in binaural sound during an electronic communication between two or more users. A processor convolves the sound clips with HRTFs, and the sound externally localize away from a head of the user listening to the sound clip.

One example embodiment plays sound clips to users during the electronic communication without transmitting the sound clips to electronic devices of the users listening to the sound clips.

One example embodiment replaces or changes a sound clip convolved with generic HRTFs with the sound clip convolved with customized HRTFs to the user listening to the sound clip.

Other example embodiments are discussed herein.

DETAILED DESCRIPTION

In order to provide effective three-dimensional (3D) sound or binaural sound to a listener, the sound must be convolved with head-related transfer functions (HRTFs). This requirement to process the sound with HRTFs can be problematic, especially when two users are exchanging sound files or sound clips during an electronic communication.

Consider an example in which two users are communicating with a messaging application or telephony application, and the first user wants to send the second user a sound clip in binaural sound. The first user, however, may not have the HRTFs individualized or customized to the second user and hence is not able to send the sound clip convolved with correct HRTFs. If the first user sends the sound clip convolved with general or generic HRTFs, then the second user may not correctly localize the sound in the sound clip. For example, the sound may externally localize to the wrong location or not externally localize at all.

Additionally, even if the second user can correctly localize the sound when the sound clip is convolved with general HRTFs, wirelessly transmitting the sound clip over a network can be time-consuming and require large bandwidth, especially if the sound clip is a large file. During the electronic communication, both users have to wait while the sound clip downloads to the electronic device of the second user and then wait again while the sound clip is convolved with the HRTFs. If the sound clip is convolved into binaural sound during the electronic communication, then this process is time-consuming and uses resources of a computer processor.

Example embodiments solve these problems and others by providing methods and apparatus that enable users to quickly provide binaural sound to each other during an electronic communication. Example embodiments require less processing resources than conventional techniques and enable sound clips to play more expeditiously during an electronic communication between two or more users.

One example embodiment convolves sound clips with HRTFs before an electronic communication commences between two or more users. During a subsequent electronic communication between the users, the sound clips can be immediately played to the users without requiring convolution since they were previously convolved. As such, processing resources (such as those of a digital signal processor or DSP) are not required to convolve the sound clips with HRTFs during the electronic communication. This process enables sound clips to be played in real-time between the users.

In a conventional electronic communication, sound clips are exchanged between electronic devices of users over a network. For example, if a first user wants to play a sound clip to a second user while the two users message or talk, then the first user transmits the sound clip to the electronic device of the second user. This transmission often occurs over a wireless network, such as the internet or a cellular network. The electronic device of the second user receives the sound clip, downloads it, and plays it to the second user. This process is time-consuming and utilizes much processing resources. For example, if the internet connection is slow, then the users have to wait while the sound clip uploads from the first electronic device and downloads to the second electronic device. As such, users are not able to interact with each other in real-time as they wait for the sound clips to be transmitted over the network, uploaded from one electronic device, and downloaded to another electronic device.

Example embodiments solve these problems and enable users to play sound clips to each other in real-time during an electronic communication without exchanging the sound clips during the electronic communication. In order to expedite playing of sound clips in binaural sound during an electronic communication, the electronic devices exchange unique identifications that identify the sound clips that are already stored on the electronic devices. The sound clips themselves are not required to be exchanged (e.g., not required to be transmitted from the electronic device of the first user to the electronic device of the second user while the two users chat or talk to each other). Each unique identification identifies a sound clip to be played. These identifications are much smaller in size than the actual sound clips and hence can be transmitted and processed quickly over a network to enable real-time playing of the sound clips. When an electronic device receives the unique identification, the corresponding sound clip is retrieved from memory and played to the user. This sound clip may already be convolved with the HRTFs of the user and hence enable immediate playback to the user receiving the unique identification. Uploading, transmitting, downloading, and convolving of the sound clip are avoided. This significantly increases execution of playing sound clips during the electronic communication.

One example embodiment displays sound clips to the users while the users communicate with each other. During the electronic communication, a user can quickly select a sound clip in binaural sound that instantly plays to the other user. The sound clips, for example, display as icons, emoji, emoticons, other graphical representations, text, word(s), or other indicia. When the user selects or activates one of the representations, the sound clip associated with or corresponding to this representation immediately plays as binaural sound at the electronic device of the other user without requiring transmission of the selected sound clip.

When the sound clip plays, sound externally localizes to the listener as three-dimensional (3D) sound or binaural sound. The listener hears the sound as originating outside of or away from the head of the listener, such as emanating in empty space (e.g., where no physical object is located) or at an object proximate to the listener.

Another problem is that a computer system or electronic device does not know whether to convolve a sound clip or not. Even if the sound clip is to be convolved, what or whose HRTFs (if any) should be used?

Example embodiments solve this problem as well. The computer system or electronic devices stores or tracks information about a sound clip in order to determine how to convolve the sound clip. For example, this information includes determining a format of the sound clip (e.g., mono, stereo, or binaural), determining if customized or generic HRTFs of the listener are available, and determining if the sound clip is already convolved with generic or customized HRTFs.

Another problem is that sound clips in binaural sound convolved for one user may not correctly localize for another user. Consider an example in which user A has sound clips in binaural sound that were convolved with customized HRTFs for user A. User B has sound clips in binaural sound that were convolved with customized HRTFs for user B. During an electronic communication between users A and B, user A sends user B a sound clip to be played. When user B hears the sound clip, however, the sound does not externally localize but internally localizes inside his head. Alternatively, the sound externally localizes to an unintended location, such as localizing behind the head of user B when the sound was intended to localize in front of the head of user B. The sound clip will not correctly localize to user B because the sound was convolved with HRTFs that are specific to the shape of the head and ears of User A. Likewise, when user B sends sound clips to user A, they do not correctly localize to user A because the sound clips were convolved for user B not for user A.

Example embodiments solve this problem. Example embodiments play sound clips convolved with HRTFs for the specific user intended to hear the sound clip. For example, when user A sends user B a sound clip convolved with customized HRTFs of user A, the example embodiment does not play this sound clip to user B. Instead, the example embodiment retrieves and plays the sound clip convolved with the HRTFs of user B. For example, the sound clip that user A sends is replaced or exchanged with a sound clip convolved for user B. Both sound clips play the same sound (e.g., both play the same message), but the sound clip provided to user B localizes to the correct or intended external locations.

In an example embodiment, user A does not actually send the sound clip but sends an identification of the sound clip. This identification enables an example embodiment to retrieve and play the intended sound clip to user B. This sound clip for user B was already convolved with the correct HRTF pairs before user A selected and requested the sound clip to be played to user B. In another example embodiment, the sound clip is convolved in real-time when user A selects and requests the sound clip to be played to user B.

FIG. 1 is a method to play sound clips in binaural sound during an electronic communication between users in accordance with an example embodiment.

Block 100 states generate sound clips to provide in an electronic communication.

By way of example, a computer or electronic device generates the sound clips (computer-generated sound), or microphones capture the sound for the sound clips. For instance, one or more microphones capture the sound as mono sound, stereo sound, or binaural sound.

Consider an example in which microphones record a voice of a person while the person is in a sound studio or recording room. As another example, microphones positioned in ears of a dummy head record the sound. As another example, a computer program or software program generates the sounds.

The sound clips are stored in and obtained from memory of an electronic device (such as a computer or server) and/or transmitted or streamed over one or more networks.

Block 110 states process or convolve the sound clips into binaural sound.

For example, a processor (such as a DSP) processes or convolves the sound with one or more of head-related transfer functions (HRTFs), head-related impulse responses (HRIRs), room impulse responses (RIRs), room transfer functions (RTFs), binaural room impulse responses (BRIRs), binaural room transfer functions (BRTFS), interaural time delays (ITDs), interaural level differences (ITDs), and a sound impulse response.

One example embodiment processes or convolves the sound clips with the HRTFs before the electronic communication commences or before a point in time when the sound clips are requested for play during the electronic communication.

Another example embodiment processes or convolves the sound clips during the electronic communication or at a point in time when the sound clips are requested for play in the electronic communication.

Sound includes, but is not limited to, one or more of stereo sound, mono sound, binaural sound, computer-generated sound, sound captured with microphones, and other sound. Furthermore, sound includes different types including, but not limited to, music, background sound or background noise, human voice, computer-generated voice, and other naturally occurring or computer-generated sound.

When the sound is recorded or generated in mono sound or stereo sound, convolution changes the sound to binaural sound. For example, one or more microphones record a human person speaking in mono sound or stereo sound, and a processor processes this sound with filters to change the sound into binaural sound.

The processor or sound hardware processing or convolving the sound can be located in one or more electronic devices or computers including, but not limited to, headphones, smartphones, tablet computers, electronic speakers, head mounted displays (HMDs), optical head mounted displays (OHMDs), electronic glasses (e.g., glasses that provide augmented reality (AR)), servers, portable electronic devices (PEDs), handheld portable electronic devices (HPEDs), wearable electronic devices (WEDs), and other portable and non-portable electronic devices. These electronic devices can also be used to execute example embodiments.

For example, the DSP processes or convolves stereo sound or mono sound with a process known as binaural synthesis or binaural processing to provide the sound with sound localization cues (ILD, ITD, and/or HRTFs) so the listener externally localizes the sound as binaural sound or 3D sound.

HRTFs can be obtained from actual measurements (e.g., measuring HRIRs and/or BRIRs on a dummy head or human head) or from computational modeling. HRTFs can also be general HRTFs (also known as generic HRTFs) or customized HRTFs (also known as individualized HRTFs). Customized HRTFs are specific to an anatomy of a particular listener. Each person has unique sets or pairs of customized HRTFs based on the shape of the ears or pinnae, head, and torso.

An example embodiment models the HRTFs with one or more filters, such as a digital filter, a finite impulse response (FIR) filter, an infinite impulse response (IIR) filter, etc. Further, an ITD can be modeled as a separate delay line.

When the binaural sound is not captured (e.g., on a dummy head or human head), the captured sound is convolved with sound localization information (SLI). This information includes one or more of HRTFs, HRIRs, BRTFs, BRIRs, ILDs, ITDs, and/or other information discussed herein. By way of example, SLI are retrieved, obtained, or received from memory, a database, a file, an electronic device (such as a server, cloud-based storage, or another electronic device in the computer system or in communication with a PED providing the sound to the user through one or more networks), etc. Instead of being retrieved from memory, this information can also be calculated in real-time.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or sound localization point (SLP). For example, the sound localizes to a specific point (e.g., localizing to point $(r, \theta, \phi)$) or a general location or area (e.g., localizing to far-field location $(\theta, \phi)$ or near-field location $(\theta, \phi)$). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle ($\theta$), and/or an elevation angle ($\phi$).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener as the customized HRTFs.

A HRTF is a function of frequency (f) and three spatial variables, by way of example $(r, \theta, \phi)$ in a spherical coordinate system. Here, r is the radial distance from a recording point where the sound is recorded or a distance from a listening point where the sound is heard to an origination or generation point of the sound; $\theta$ (theta) is the azimuth angle between a forward-facing user at the recording or listening point and the direction of the origination or generation point of the sound relative to the user; and $\phi$ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates $(r, \theta, \phi)$ for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information are calculated or extracted from the HRTF data files. A unique set of HRTF information (including r, θ, φ) is determined for each unique HRTF.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound). Sound can also switch between externally localizing and internally localizing, such as appearing to move and pass through a head of a listener.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file or sound clip) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses. Alternatively or additionally, the FIR filters are obtained from another source, such as generated from a computer simulation or estimation, generated from a dummy head, retrieved from storage, computed based on known impulse responses captured from people, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location (θ, φ) with discrete Fourier transforms (DFTs) calculated for the left and right ears. The ITD is located at the point for which the function attains its maximum value, known as the argument of the maximum or arg max as follows:

$$ITD = \arg\max(\tau) \sum_n d_{l,\theta,\phi}(n) \cdot d_{r,\theta,\phi}(n+\tau).$$

Subsequent sounds are filtered with the left HRTF, right HRTF, and/or ITD so that the sound localizes at (r, θ, φ). Such sounds include filtering stereo and monaural sound to localize at (r, θ, φ). For example, given an input signal as a monaural sound signal s(n), this sound is convolved to appear at (θ, φ) when the left ear is presented with:

$$s_l(n) = s(n-\text{ITD}) \cdot d_{l,\theta,\phi}(n);$$

and the right ear is presented with:

$$s_r(n) = s(n) \cdot d_{r,\theta,\phi}(n).$$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau) \cdot h(\tau) = \int_0^\infty x(\tau - t) \cdot h(t) \cdot dt.$$

This reduces to a summation when the impulse response has a given length N and the input signal and the impulse response are sampled at t=iDt as follows:

$$y(i) = \sum_{j=0}^{N-1} x(i-j) \cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is preprocessed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

Block 120 states store the convolved sound clips in memory of one or more electronic devices.

For example, the sound clips are stored in memory of an HPED, PED, WED, server, or other electronic device discussed herein. Further, the sound clips can be stored before the electronic communication commences or before the sound clips are requested to be played. Additionally, the sound clips can be transmitted over one or more networks, such as transmitting them to a database, server, HPED, or other electronic devices during or before the electronic communication.

Consider an example in which the sound clips are convolved with HRTFs and then stored in the electronic devices of the users (e.g., smartphones, WEDs, and HMDs). In this way, the sound clips are already processed and ready to be played as binaural sound immediately upon request.

Block 130 states commence an electronic communication where the sound clips will be played to one or more users.

Example embodiments include, but are not limited to, providing sound or voice from sound clips to one or more listeners that are engaged in various forms of electronic communication, such as software applications that enable users to talk in a telephone call or telephony call, chat, text, or message each other, send and receive voice messages, and speak to or with a human, computer, or software program (such as an intelligent user agent (IUA) or intelligent personal assistant (IPA)). Furthermore, the electronic communication can occur at different locations, such as two or more people meeting in a VR chat room or chat space, talking or messaging with AR images in a Vo IP call, etc.

Example embodiment can occur during execution of a telephone call. A telephone call is a connection over a wired and/or wireless network between a calling person or user and a called person or user. Telephone calls use landlines, mobile phones, satellite phones, HPEDs, WEDs, voice personal assistants (VPAs), computers, and other portable and non-portable electronic devices. Further, telephone calls are placed through one or more of a public switched telephone network, the internet, and various types of networks (such as Wide Area Networks or WANs, Local Area Networks or LANs, Personal Area Networks or PANs, Campus Area Networks or CANs, private or public ad-hoc mesh networks, etc.). Telephone calls include other types of telephony including Voice over Internet Protocol (VoIP) calls, internet telephone calls, in-game calls, voice chat or channels, telepresence, etc.

Consider an example in which two or more users chat or text with a software messaging application or mobile application and exchange sound clips already convolved into binaural sound. As another example, users exchange these sound clips while meeting in a virtual chat room or talking to each other while wearing a HMD, electronic glasses, or another electronic device that provides VR or AR images during the electronic communication.

Block 140 states play the processed or convolved sound to the user with speakers so the sound externally localizes as the binaural sound away from the head of the user.

Binaural sound is provided to the listener through one or more electronic devices including, but not limited to, one or more bone conduction headphones, speakers of a wearable electronic device (e.g., headphones, earphones, electronic glasses, earbuds, head mounted display, smartphone, etc.). Binaural sound can be processed for crosstalk cancellation and provided through other types of speakers (e.g., dipole stereo speakers).

For example, two speakers are in or on an electronic device that the listener wears, such as headphones, HMD, electronic glasses, smartphone, or another WED, PED, or HPED. Alternatively, the speakers are not with or worn on the listener, such as being two or more separate speakers that provide binaural sound to a sweet spot using cross-talk cancellation.

From the point-of-view of the listener, the sound originates or emanates from the object, point, area, or location that corresponds with the SLP. When binaural sound is provided to the listener, the listener will hear the sound as if it originates from the sound source. The sound, however, does not originate from the sound source since the sound source may be an inanimate object with no electronics or an animate object with no electronics. Alternatively, the sound source has electronics but does not have the capability to generate sound (e.g., the sound source has no speakers or sound system). As yet another example, the sound source has speakers and the ability to provide sound but is not providing sound to the listener. In each of these examples, the listener perceives the sound to originate from the sound source, but the sound source does not produce the sound. Instead, the sound is altered or convolved and provided to the listener so the sound appears to originate from the sound source.

In an example embodiment, at least a portion of the sound clip externally localizes away from the head of the listener in empty space or occupied space (e.g., where no physical or tangible object exists). For example, the sound externally localizes proximate or near the listener, such as localizing within a few meters of the listener. For instance, the sound localization point (SLP) where the listener localizes the sound is stationary or fixed in space (e.g., fixed in space with respect to the user, fixed in space with respect to an object in a room, fixed in space with respect to an electronic device, fixed in space with respect to another object or person).

Figure 2:
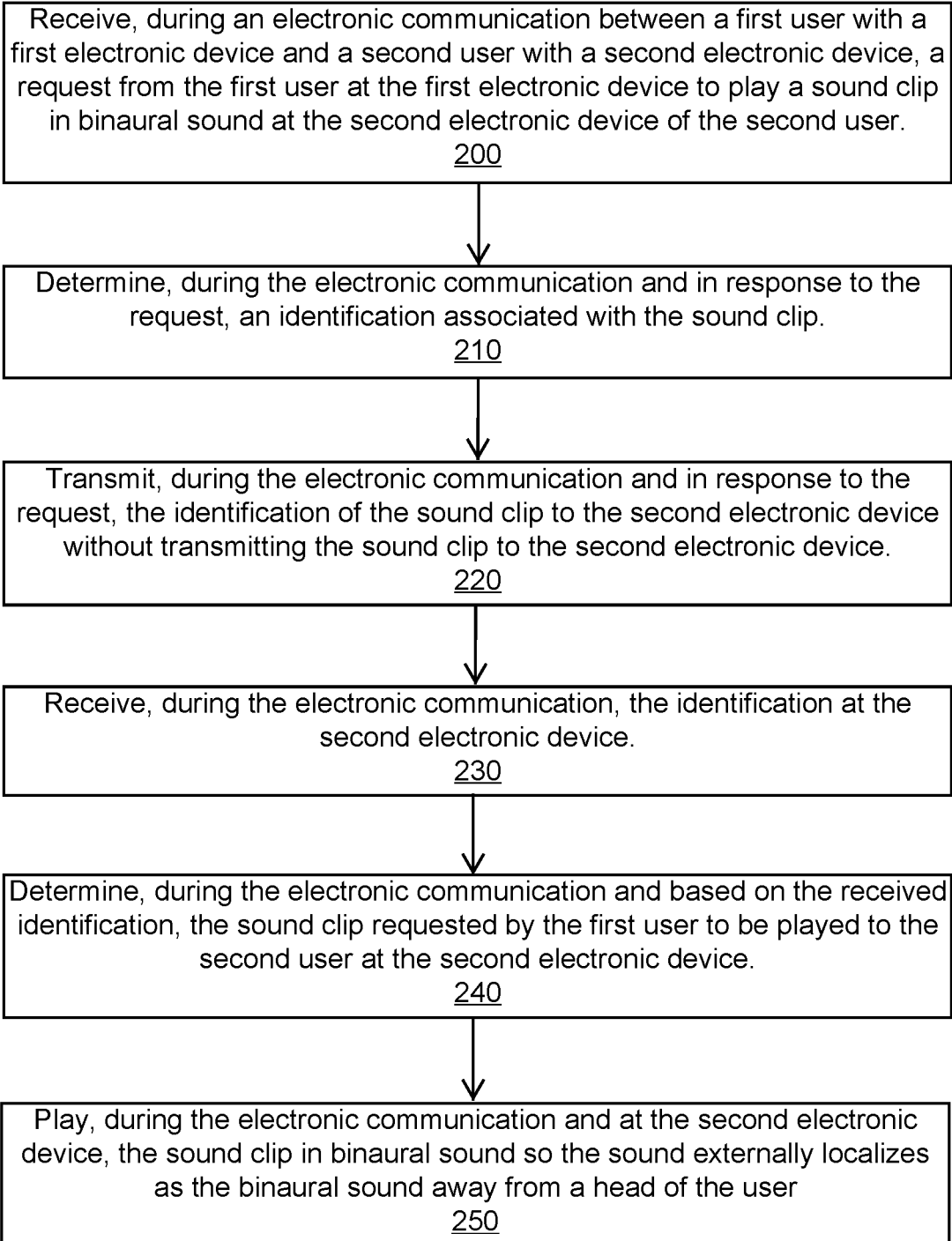
FIG. 2 is a method to play sound clips in binaural sound at electronic devices without transmitting the sound clips to the electronic devices in accordance with an example embodiment.

FIG. 2 is a method to play sound clips in binaural sound at electronic devices without transmitting the sound clips to the electronic devices in accordance with an example embodiment.

Block 200 states receive, during an electronic communication between a first user with a first electronic device and a second user with a second electronic device, a request from the first user at the first electronic device to play a sound clip in binaural sound at the second electronic device of the second user.

The first user interacts with the first electronic device to generate the request. For example, the first user interacts with a user interface and provides a command or instruction to play the sound clip in binaural sound to the second user. For instance, the first user performs one or more actions that include, but are not limited to, clicking or activating an icon, emoji, graphical representation, or other indicia that represents the sound clip or represents sending the sound clip, selecting the sound clip from a menu (such as a dropdown menu), selecting the sound clip from a folder or file (such as a folder or file being displayed to the first user), providing a body gesture (such as a hand gesture or hand movement indicating a desire to play the sound clip), providing head movement or eye movement (such as the first user moving his or her head in a certain direction or pattern to indicate selection of the sound clip), providing a voice command (such as the first user speaking an instruction at a natural language user interface), or taking another action to have the sound clip played to the second user.

Block 210 states determine, during the electronic communication and in response to the request, an identification associated with the sound clip.

In an example embodiment, each sound clip includes, corresponds with, or is associated with an identification. For instance, each sound clip has a unique identification number or unique feature that enables it to be distinguished from other sound clips.

Consider an example in which each sound clip is associated with a unique identifier. The unique identifiers are stored in memory, such as a lookup table or other format. An example embodiment retrieves the unique identifier from memory when the first user activates the sound clip or otherwise requests the sound clip be played to the second user.

Consider an example in which the electronic device displays graphical representations (e.g., icons, emoji, or emoticons) to the first user. When the user clicks, selects, or activates one of the graphical icons, this action triggers execution of a program, code, or software instruction to retrieve a unique identification of the sound clip associated with the graphical representation. As another example, the graphical representation itself includes code, instructions, or a command that provides or generates the identification. For example, each graphical representation is designated or coded with a unique identifier that enables the computer system to distinguish between the different graphical representations and know which one is being selected by the first user.

Block 220 states transmit, during the electronic communication and in response to the request, the identification of the sound clip to the second electronic device without transmitting the sound clip to the second electronic device.

In an example embodiment, the first electronic device transmits the identification to the second electronic device, such as transmitting the identification over one or more wireless networks.

Consider an example in which the first user commands or instructs the sound clip to play to the second user during an electronic communication between the first and second users. In response to this command or instruction, the first electronic device transmits a unique identifier to the second electronic device with the second user. This unique identifier identifies to the second electronic device which sound clip is being requested to be played.

In another example embodiment, a server or another electronic device transmits the identification to the second electronic device. Consider an example in which the first and second users talk or message each other with a mobile software application. The application executes on the electronic devices and one or more servers. When the first user clicks on a 3D sound emoji, this action causes one of the servers to transmit an identifier assigned to the 3D sound emoji to the second electronic device.

The identification transmits to the second electronic device but this transmission is not required to include the actual sound clip or sound file that will be played to the second user at the second electronic device. At this point in time, the sound clip is not transmitted to the second electronic device. The second electronic device already includes the sound clip, and hence transmission of the sound clip is not necessary. For example, the second electronic device stores the sound clip in memory before the first user made the request at the first electronic device to play the sound clip at the second electronic device.

As another example, a server or another electronic device provides the sound clip to the second electronic device in anticipation of the request. Before the first user makes the actual request to play the sound clip to the second user, the second electronic device receives the sound clip from a server or memory. For instance, sound clips are downloaded to or streamed to the second electronic device when the first and second users commence the electronic communication but before the actual request from the first user. As another example, one or more sound clips are downloaded to the second electronic device based on user preferences or historic usage. For instance, the first user has a history of sending a particular sound clip to the second user (or other users). In response to this pattern of previous usage, the second electronic device receives this particular sound clip in anticipation of being requested.

Block 230 states receive, during the electronic communication, the identification at the second electronic device.

The second electronic device receives the identification via a wired or wireless interface. For instance, the second electronic device includes a wireless transmitter/receiver that receives the identification over the internet or other wireless network.

Block 240 states determine, during the electronic communication and based on the received identification, the sound clip requested by the first user to be played to the second user at the second electronic device.

The second electronic device, server, or another electronic device determines (based on the identification) the sound clip desired to be played to the second user at the second electronic device. By way of example and as noted above, the identification corresponds with or is associated with a sound clip, such as a sound clip stored in memory of the second electronic device. The example embodiment retrieves the sound clip based on or assigned to the identification.

Consider the example in which each sound clip is associated with a unique identifier. The unique identifiers are stored in memory, such as a table or lookup table. The second electronic device compares the unique identifier with a list of unique identifiers that each correspond to a sound clip. When a match between identifiers occurs, the second electronic device selects the sound clip corresponding to or associated with the matched identifier.

Block 250 states play, during the electronic communication and at the second electronic device, the sound clip in binaural sound so the sound externally localizes as the binaural sound away from the head of the user.

The sound clip plays to the second user through one or more speakers and localizes as near-field or far-field binaural sound. By way of example, a source of the sound emanates from or originates from a SLP or area that is in empty space, at a physical object, or at an image (such as a VR or AR image). For example, this location is proximate to the second user (e.g., within 1-3 meters from a head of the second user), less than one meter away from the second user, one meter away from the second user, or greater than one meter away from the second user.

Consider an example in which the first user sends the second user a sound clip in stereo or mono that when executed plays a famous quote or line from a feature length film or movie. The sound clip or transmission of the sound clip includes an identification that specifies one or more of: (1) an identification of the sound clip, (2) instructions that the sound clip should be convolved with HRTFs and/or played as binaural sound, (3) an identification of which HRTFs to select, and (4) coordinate locations of the SLP (e.g., spherical coordinate locations of the HRTFs that should be used to convolved the sound clip). Upon receiving the sound clip, the electronic device of the second user retrieves customized HRTFs having the coordinates specified in the transmission, convolves the sound clip with these customized HRTFs of the second user, and plays the sound clip to the second user. The sound clip executes as binaural sound, and the second user hears the voice of the speaking actor as if the actor where standing one meter away and speaking to the second user.

Figure 3:
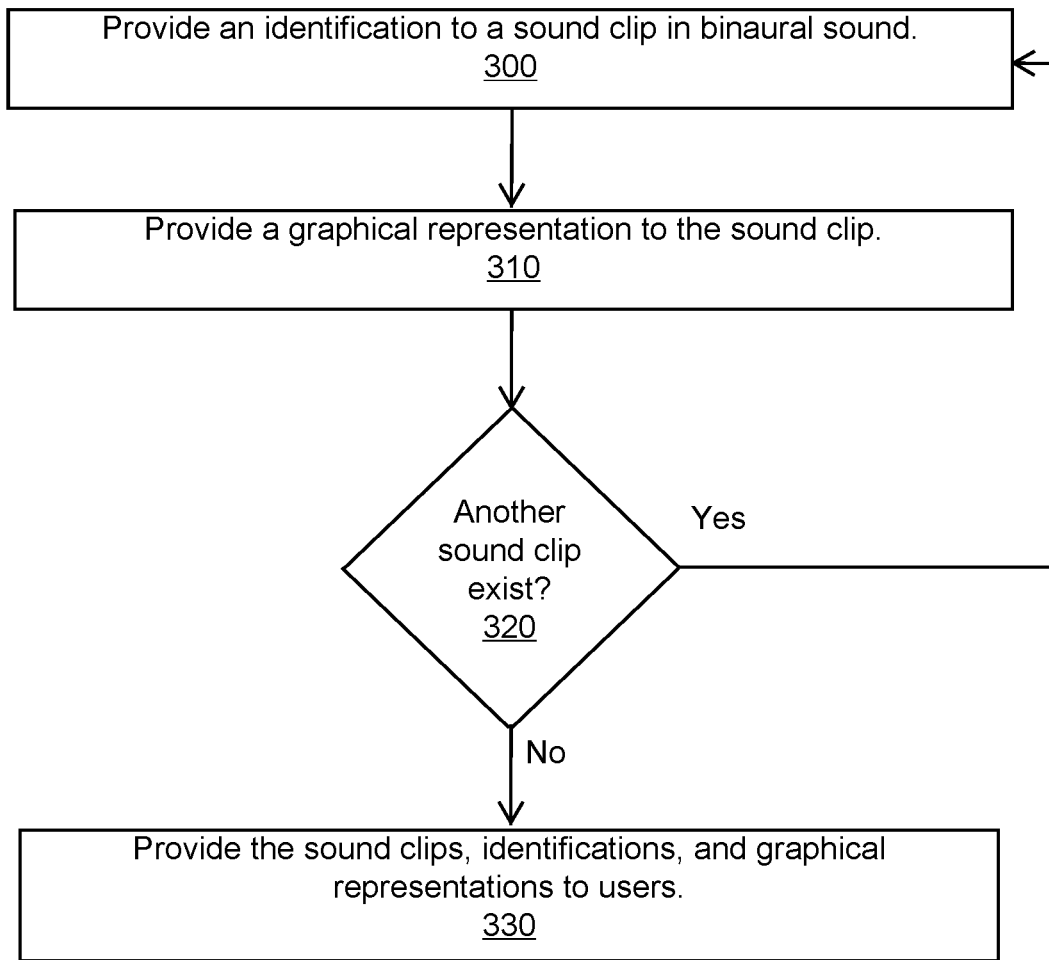
FIG. 3 is a method to provide sound clips and identifications of the sound clips to users in accordance with an example embodiment.

FIG. 3 is a method to provide sound clips and identifications of the sound clips to users in accordance with an example embodiment.

Block 300 states provide an identification to a sound clip.

The identification enables the computer system or electronic device to distinguish one sound clip from another sound clip. For example, users may have access to ten sound clips, hundreds of sound clips, or thousands of sound clips. When a user activates, purchases, transmits, or performs another action with regard to the sound clip, one or more unique identifications are used to identify the sound clip.

Sound clips can be identified in different ways. For example, the computer system assigns each sound clip with a unique identification, such as a unique serial number, identification number, unique identifier (UID), random number, name, or code. Further, each sound clip can have more than one identification (e.g., having different UIDs for different purposes).

Block 310 states provide a graphical representation to the sound clip.

Graphical representations include, but are not limited to, pictures, images (including an AR image or a VR image), icons, emoji, emoticons, text, words, symbols, numbers, or other visible indicia.

In an example embodiment, the graphical representation visually informs the user about the contents of the sound clip. The graphical representation provides information so the user knows in advance what sound will play when the graphical representation is activated. For example, if the sound clip plays a 3D audio of a voice saying "Hello" then the graphical representation might include the word "Hello" or a picture (such as a waiving hand) to indicate the contents of the sound file are a greeting.

Block 320 makes a determination whether another sound clip exists. If the answer to this determination is "yes" then flow proceeds back to block 300. If the answer to this determination is "no" then flow proceeds to block 330.

Block 330 states provide the sound clips, identifications, and graphical representations to users.

Users can purchase sound clips, send sound clips, play sound clips, transmit sound clips, exchange sound clips, and perform other actions. For example, electronic devices of users store the sound clips, identifications, and graphical representations and/or provide access to this information. Further, the sound clips, identifications, and graphical representations can be stored on and accessed through a network, such as storing the information in a database and providing access through a server.

Consider an example in which a company generates hundreds or thousands of sound clips in binaural sound. Some of these sound clips are captured in binaural sound, while others are captured in mono or stereo sound and then convolved into binaural sound using HRTFs. The company provides these sound clips to users so the users can play them to each other via a mobile application on their HPEDs.

Figure 4:
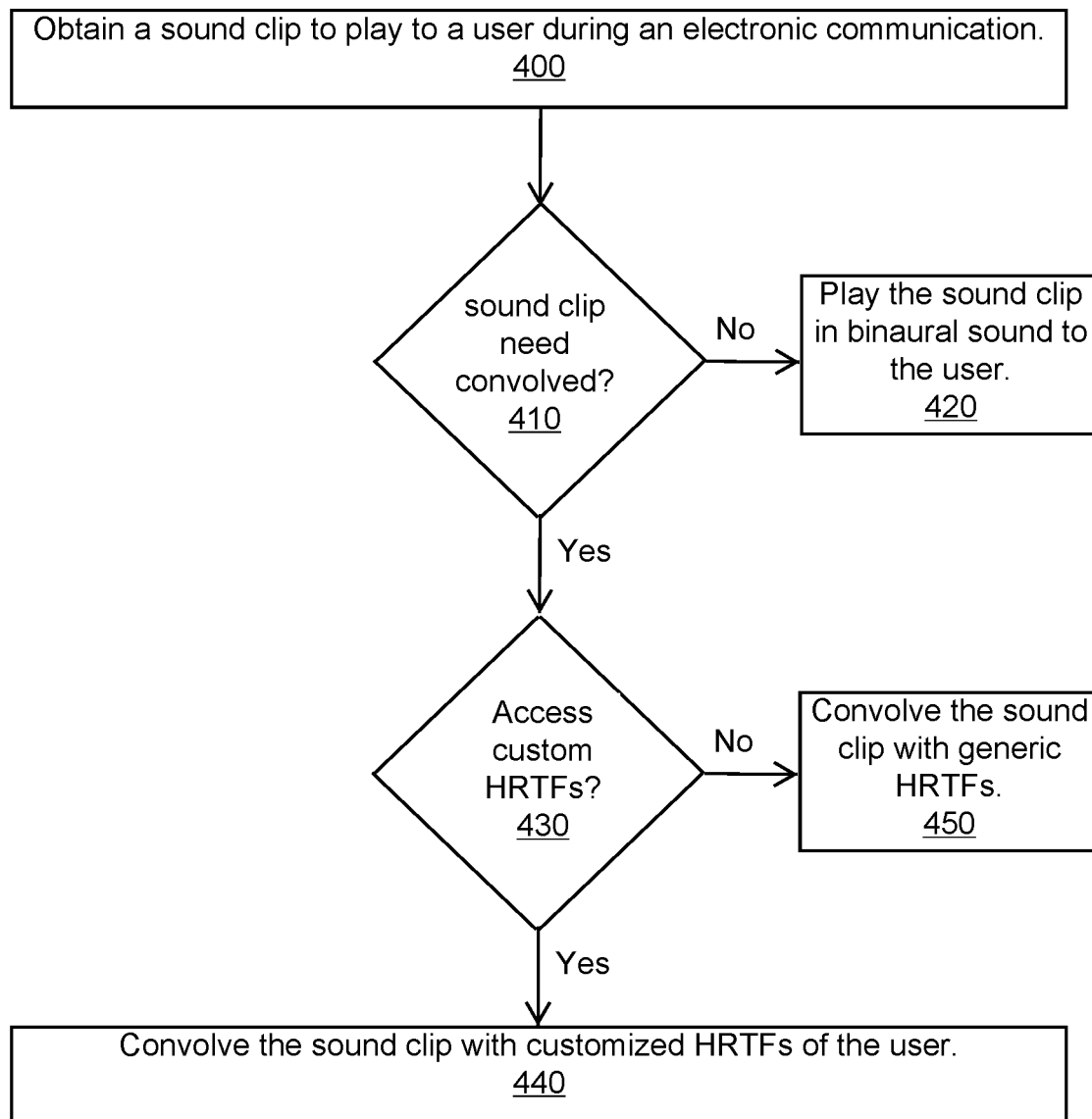
FIG. 4 is a method to determine whether to convolve a sound clip with customized or generic HRTFs in accordance with an example embodiment.

FIG. 4 is a method to determine whether to convolve a sound clip with customized or generic HRTFs in accordance with an example embodiment.

Block 400 states obtain a sound clip to play to a user during an electronic communication.

For example, an electronic device receives the sound clip over a wireless network, retrieves the sound clip from memory, or records the sound clip in real-time (e.g., records the sound clip with one or more microphones).

Block 410 makes a determination as to whether the sound clip needs convolved.

A sound clip in mono sound or stereo sound is not in binaural sound and hence is convolved with a processor into binaural sound. Sound clips in binaural sound can also be further processed or convolved (e.g., adding RIRs to a binaural sound clip).

If the answer to this determination in block 410 is "no" then flow proceeds to block 420.

Block 420 states play the sound clip in binaural sound to the user. For example, headphones, earbuds, or earphones play the sound to the user.

If the answer this determination in block 410 is "yes" then flow proceeds to block 430.

Block 430 makes a determination whether the computer system or electronic device has access to customized HRTFs of the user.

Customized HRTFs may not be available for a user, or the user may keep such HRTFs private or unavailable. These HRTFs can be stored in local memory (e.g., encrypted and stored in an HPED) or stored in memory on a network or cloud (e.g., stored in a server or database).

The computer system or electronic device can also store whether customized or generic HRTFs are available for each user. For example, a graphical or relational database stores user names (or user identifications), customized HRTFs for each user if such HRTFs are available, and generic HRTFs for users or groups of users.

If the answer this determination in block 430 is "yes" then flow proceeds to block 440.

Block 440 states convolve the sound clip with customized HRTFs of the user. For example, a processor (such as a DSP) convolves the sound with the customized HRTFs.

If the answer this determination in block 430 is "no" then flow proceeds to block 450.

Block 450 states convolve the sound clip with generic HRTFs. For example, a processor (such as a DSP) convolves the sound with the generic HRTFs.

Customized HRTFs are particular or specific to the anatomy of the user. For example, such HRTFs are based on one or more of the shape and/or size of the head, ear or pinnae, and torso since these factors influence how sound impulses interact with a user before entering his or her ear canal. Sound convolved with these HRTFs provides the best or most accurate external sound localization to the user.

General or generic HRTFs work for a large number of people and are not specific to a single individual. These HRTFs are typically derived from common physical traits relating to the shape and/or size of the head, ear or pinnae, and torso of these people. These HRTFs are also derived from computer models or computer programs.

Users can accurately localize binaural sound with generic HRTFs. In some instances, however, sounds will not localize to the correct location or not externally localize at all. By contrast, customized HRTFs provide a user with more accurate external localization. Hence, customized HRTFs are preferred over generic HRTFs when accuracy and consistency of external sound localization are desired.

The computer system or electronic device can also store generic HRTFs for classes or groups of users. For example, some generic HRTF pairs will externally localize sound more accurately for some users than other users. For instance, female Caucasian people are in one group and include a first set of HRTF pairs; male Caucasian people are in another group and include a second set of HRTF pairs; female Asian people are in another group and include a third set of HRTF pairs, etc. Such groups and corresponding HRTFs can be based on different factors, such as race, gender, head size, head shape, ear size, ear shape, ethnicity, etc.

The convolved sound clip is played to the user, transmitted over one or more networks, and/or stored in memory for subsequent use.

Information about or identification of a sound clip can be stored in the file (such as a header or elsewhere), part of the file format, a tag, or stored as metadata. In this way, the computer system or electronic device knows what action to take with a sound file or a request for a sound file. For example, while talking or chatting via a mobile messaging application, an electronic device of user A sends a sound clip to an electronic device of user B. The electronic device of user B receives the sound clip, detects it is in mono sound, determines customized HRTFs are stored in local memory for user B, convolves the sound clip with the customized HRTFs, and plays the convolved sound clip to user B.

FIG. 5 is a method to change or replace a sound clip convolved with HRTFs for a user intended to listen to the sound clip in accordance with an example embodiment.

Block 500 states receive, during an electronic communication between a first user with a first electronic device and a second user with a second electronic device, a sound clip convolved with customized HRTFs to the first user or generic HRTFs and intended to be played to the second user.

By way of example, the first user sends the second user a sound clip that is convolved with HRTFs specific to the first user, such as customized HRTFs that were recorded in an anechoic chamber, customized HRTFs that were computer-generated HRTFs based on a size and/or shape of the head and/or ear of the first user, or other HRTFs previously selected to work for the first user.

Alternatively, the sound is not convolved with customized HRTFs of the first user but with generic HRTFs.

The electronic device of the first user does not have to actually transmit the sound clip to the electronic device of the second user. The first user can send an identification of the sound clip as discussed herein. For example, the sound clip is not transmitted but is stored in a database or server, and the first user sends a request to play the sound clip to the second user. For instance, this request includes a network location where the sound clip is located. For instance, the sound clip is located at or retrievable from a website.

Block 510 states change or replace the sound clip convolved with the HRTFs from the first user with a sound clip convolved with customized HRTFs of the second user.

Sound convolved with HRTFs from the first user may not accurately externally localize to the second user regardless of whether these HRTFs are customized to the first user or generic. Sound convolve with customized or individualized HRTFs for the second user will more accurately externally localize as binaural sound to the second user. These customized or individualized HRTFs can be obtained from actual measurements of impulse responses of the second user or modeled based on one or more physical attributes of the second user (e.g., based on one or more of head shape, head size, ear shape, ear size, etc.).

The sound clip convolved with the HRTFs from the first user can be changed or replaced in different ways. Changing or replacing this sound clip includes changing, altering, or editing the sound clip of the first user, exchanging the sound clip of the first user with another sound clip, de-convolving the sound clip of the first user then convolving the sound clip, transforming the sound clip of the first user into stereo or mono sound and then convolving the sound clip into binaural sound, obtaining the sound clip in a different format (e.g., stereo or mono) and convolving the sound clip, or taking and action that provides sounds in the sound clip of the first user to the second user so the sounds accurately externally localize to the second user.

Consider an example in which the first user sends the second user a sound clip with a prerecorded voice of a woman saying "hello." This sound clip is convolved with generic HRTFs. The second user, however, prefers to hear sound clips convolved with customized HRTFs of the second user since these sound clips more accurately externally localize as binaural sound. The electronic device of the second user (or a server) changes this sound clip into stereo or mono sound (or retrieves an un-convolved version of the sound clip) and then convolves the sound clip with the customized HRTFs of the second user. When the sound clip plays, the second user hears the prerecorded voice of the woman saying "hello" as binaural sound that externally localizes to the second user.

Consider an example in which the first user speaks "good morning" into her HPED. The HPED records the sound with microphones, convolves the sound with HRTFs, and transmits this sound clip to the second user. The HPED does not have customized or individualize HRTFs for the second user and hence convolves the sound with default HRTFs. The electronic device of the second user, however, stores or has access to customized or individualized HRTFs for the second user. Upon receiving the sound clip from the first HPED, the second electronic device changes or re-convolves the sound clip with the customized or individualized HRTFs of the second user and then plays this sound clip.

Consider an example in which the first and second users message each other with a mobile messaging application that provides text message, voice calls, voice messages, and exchange of sound clips in binaural sound. Both users execute the same mobile messaging application that includes hundreds of prerecorded sound clips in binaural sound. During this electronic communication, the second user asks the first user if he likes going to the beach. The first user loves to go to the beach. Instead of typing back a response of "I love going" the first user selects an icon that when selected plays a sound clip saying "I love it" to the listener (here, the second user). Both the first and second user have this icon and corresponding sound clip since they both use the same mobile messaging application. The sound clips played and stored to the first user are convolved with customized or individualized HRTFs for the first user. By contrast, the sound clips played and stored to the second user are convolved with customized or individualized HRTFs for the second user. When the first user selects the icon to play "I love it" to the second user, the electronic device does not play the sound clip convolved with the HRTFs of the first user even though the first user is making the selection. Instead, the electronic device selects the sound clip convolved with the HRTFs of the second user. In this way, the sound clip selected by the first user is replaced with the sound clip that actually plays to the second user.

Consider an example in which the first user sends or requests playing of a movie clip or a computer-generated voice greeting that is already convolved into binaural sound with HRTFs not customized or individualized to the second user. Instead of playing this version of the sound clip, the electronic device of the second user obtains the same movie clip or voice greeting but this version is not convolved with HRTFs (e.g., a copy or version in stereo or mono). The second electronic device convolves the movie clip or voice greeting with HRTFs known to work for the second user and then plays the sound clip to the second user.

Block 520 states play the processed or convolved sound clip to the second user with speakers so the sound externally localizes as binaural sound away from the head of the second user.

The sound clip plays to the user as binaural sound. The entire sound clip plays as binaural sound, or portions of the sound clip play as binaural sound. For example, the sound clip is mixed with stereo, mono, or binaural sounds.

Additionally, sounds in the sound clip can be processed to pass through the head of the user (e.g., a sound source that originates on a left side of the head of the user, passes through the head of the user, and exits through a right side of the head of the user).

Consider an example in which a first user purchases or downloads a sound clip in binaural sound that was convolved with generic HRTFs (e.g., HRTFs generated from a computer-model or retrieved from a public database that stores and provides free HRTFs to many users). The first user does not have customized HRTFs (e.g., ones based on one or more of head size, head shape, ear size, and ear shape of the first user). A second user has pairs or sets of customized HRTFs that are based on a size and/or shape of her head and ears. During an electronic communication between the first and second users, the first user transmits the sound clip to the second user. The sound clip is already convolved with HRTFs and hence could play as binaural sound to the second user. As noted though, the sound clip may not accurately externally localize to the second user since the sound clip was convolved with generic HRTFs. As such, an electronic device (such as the electronic device of the second user or a server in communication with the electronic device of the second user) replaces or changes the sound clip with a sound clip convolved with the customized HRTFs of the second user. This process ensures that the sound clip correctly externally localizes as binaural sound to the intended SLP for the second user.

Changing or replacing the sound clip convolved with generic HRTFs with a sound clip convolved with customized HRTFs can occur in a variety of ways. By way of example, one or more electronic devices actually convolve the sound clip twice at different times. For instance, a DSP in a server processes or convolves the sound clip into binaural sound and provides the convolved sound clip to the first user. Later, during the electronic communication between the first and second users, another DSP (e.g., located in the electronic device of the second user or a server in communication with the electronic device of the second user) convolves the sound clip with the customized HRTFs of the second user.

The first user can transmit or provide the sound clip to the second user in a variety of different ways. By way of example, this transmission includes transmitting the sound clip from a stored location in the electronic device of the first user to the electronic device of the second user, transmitting the sound clip from a stored location in a server or database to the electronic device of the second user, streaming the sound clip to the electronic device of the second user, providing a link to the electronic device of the second user, transmitting an identification of the sound clip to the electronic device of the second user, or providing the sound clip to the second user in another way.

Transmission of the sound clip can include both the sound clip and an identification of the sound clip. Consider the example in which the first user transmits or provides the sound clip to the second user during the electronic communication. The first user is unaware whether the second user already has the sound clip. As such, the first user transmits both the sound clip and an identification of the sound clip to the second user. If the second user does not already have the sound clip, then the electronic device of the second user plays the sound clip received from the first user. If the second user does have the sound clip, then the identification provides identifying information to enable the electronic device of the second user to retrieve and play a version of the sound clip already stored on the electronic device of the second user or already convolved with customized HRTFs of the second user. For example, the sound clip received from the first user is ignored, discarded, not played, or not downloaded. Instead, the sound clip matching the identification is retrieved and played. These two sound clips are identical in their content. The only difference is that the sound clip sent by the first user was convolved with generic HRTFs, and the sound clip played to the second user was convolved with customized HRTFs to the second user.

FIGS. 6A and 6B show an electronic device 600 with a display 610 in which two users (Glen and Philip) engage in an electronic communication. The two users exchange text messages and sound clips in binaural sound with each other.

Display 610 displays a plurality of graphical representations 620 on a lower portion of the display. Each of these graphical representations represent a sound clip in binaural sound that the users can send and/or play to each other.

As shown in FIG. 6A, the electronic communication starts when Glen sends Philip a text message saying "Hi. How are you?" In response to this message, Philip activates graphical representation 630 named "Hello." For instance, Philip clicks on the graphical representation 630 or provides a voice or body gesture command to send this sound clip. The display 610 shows activation and playing of this sound clip to Glen as "[Sending Hello sound clip]".

The electronic device of Glen receives the sound clip or instructions or command to play this sound clip (e.g., receives an identification of the sound clip but not the sound clip). The sound clip executes and plays a voice saying "Hello" to Glen, and this voice externally localizes as binaural sound. Glen is amazed to hear the voice localize near him as if a real person where talking to him. He responds to Philip with a text message: "Amazing. The sound was outside my head."

Figure 7:
FIG. 7 is a lookup table showing sound clips and unique identifications of the sound clips in accordance with an example embodiment.

FIG. 7 is a lookup table 700 showing sound clips and unique identifications of the sound clips in accordance with an example embodiment.

By way of example, table 700 includes two columns: Sound Clip Name and Unique Identification. The column Sound Clip Name provides a name or identification of each sound clip in binaural sound. Example names of sound clips shown include Hello, Wow, Thanks, Ringtone, and Movie Clip. The column Unique Identification provides a unique identification of each sound clip. This unique identification can be a unique number, number, code, identifier, string, etc.

When a user plays one of the sound clips, the sound corresponding to the sound clip externally localizes as binaural sound away from the head of the listener. For example, when a user plays the sound clip named Hello, a voice externally localizes and says "Hello." The voice originates 1-2 meters away from the user as if a person were standing near the user and saying "Hello." When the user plays the sound clip named Ringtone, a ringing sound of a telephone externally localizes to the user. For instance, the user hears a phone ringing, and the source of this sound appears about one meter away from the head of the user in empty space.

Figure 8:
FIG. 8 is a lookup table showing sound clips and sound localization information (SLI) being stored and associated with the sound clips in accordance with an example embodiment.

FIG. 8 is a lookup table 800 showing sound clips and sound localization information (SLI) being stored and associated with the sound clips in accordance with an example embodiment.

By way of example, the table 800 includes four columns: Sound Clip Name, Format, Convolved, and HRTFs Available. The column Sound Clip Name provides a name or identification of each sound clip. Example names of sound clips shown include Hello, Wow, Thanks, Ringtone, and Movie Clip. The column Format show formats of the sound clips, such as being in stereo, mono, or binaural sound. The column Convolved shows whether or how the sound clip is convolved. For example, the sound clips Hello and Wow are not convolved. The sound clips Thanks and Ringtone are convolved with generic HRTFs. The sound clip Movie Clip is convolved with customized HRTFs. The column HRTFs Available provides whether customized or generic HRTFs are available. For example, customized HRTFs are available for the sound clips Hello, Thanks, and Movie Clip. Generic HRTFs are available for the sound clips Wow and Ringtone.

FIGS. 7 and 8 illustrate storing information of example embodiments in a tables. This information, however, can be stored in other types of formats and locations, such as HPEDs, WEDs, servers, computers, hard drives, relational databases, graph databases, and other types of memory and formats.

The information stored in tables 700 and 800 (and other information discussed herein) enables example embodiments to quickly transmit, convolve, execute, and/or play sound clips between two or more users during an electronic communication.

Consider an example which a first user activates a graphical representation for the sound clip named Hello during an electronic communication with a second user. Activation of this graphical representation executes code that causes an electronic device to consult table 700, retrieve Identification 1 corresponding to the sound clip named Hello, and transmit Identification 1 to the electronic device of the second user. Upon receipt of this identification, the second electronic device consults table 700, identifies the sound clip named Hello, and plays this sound clip as binaural sound to the second user.

Consider an example which an electronic device of a first user receives a request to play the sound clip named Movie Clip. By way of example, this request occurs when the first user wants to hear and contents of Movie Clip and clicks or activates this sound clip. As another example, a second user sends this sound clip or an identification of this sound clip to the first user. Upon receiving this request (such as an instruction or command from the first user or received from another electronic device via a wireless network), the electronic device of the first user consults table 800 and determines the following information. Per column named Format, the movie clip is or should be played in binaural sound. Columns named Convolved and HRTFs Available indicate that customized HRTFs for the first user are available and should be used to convolve the movie clip. Based on this information, the electronic device of the first user convolves the movie clip with customized HRTFs and plays the movie clip to the first user.

Figure 9:
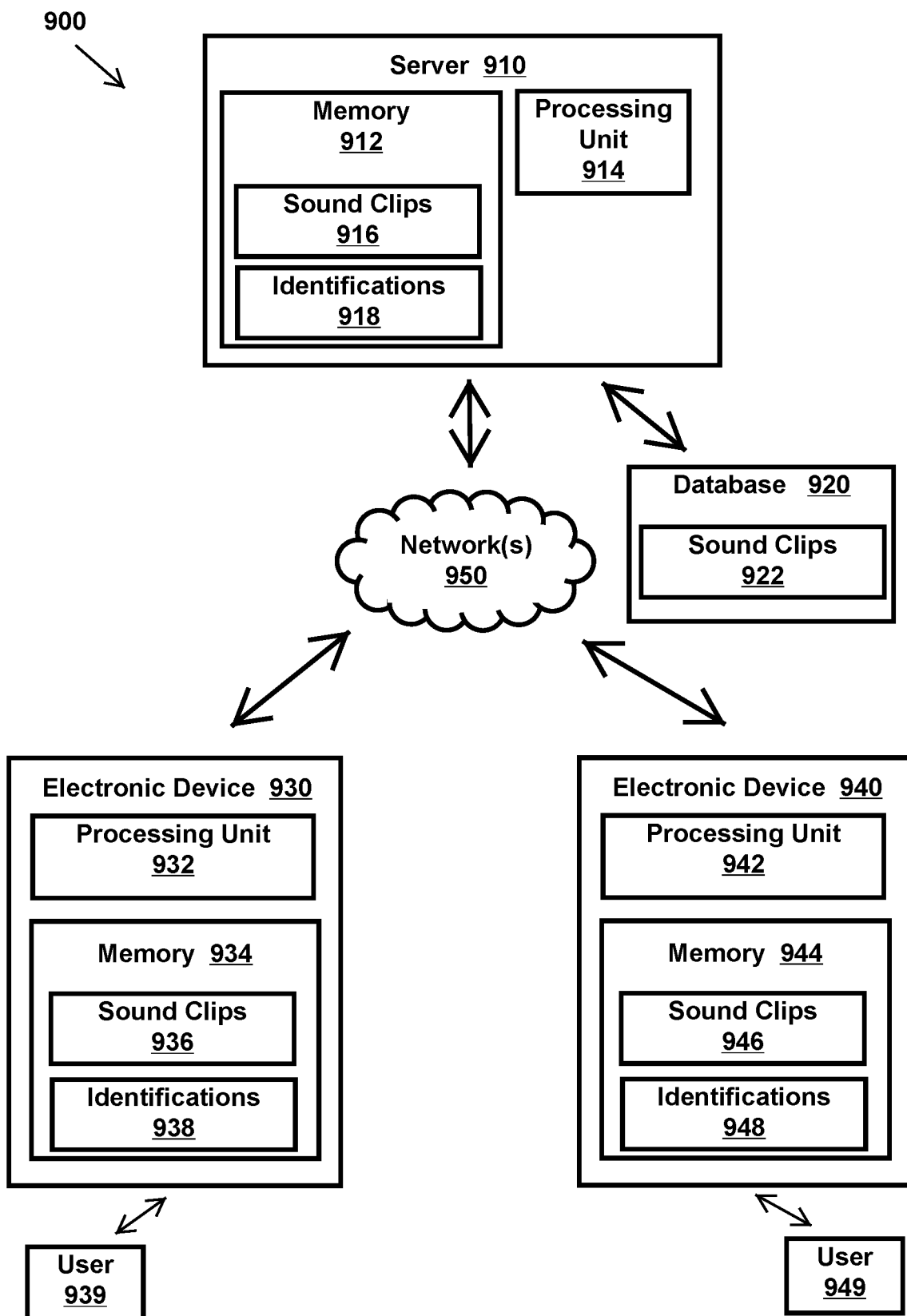
FIG. 9 is a computer system in accordance with an example embodiment.

FIG. 9 shows an example computer system 900 in accordance with an example embodiment. The computer system 900 includes one or more of a server 910, a database 920, an electronic device 930, and an electronic device 940 in communication over one or more networks 950. User 939 is with or uses electronic device 930, and user 949 is with or uses electronic device 940. For illustration, a single server 910, a single database 920, two electronic devices 930 and 940, and two users 939 and 949 are shown, but example embodiments can include a plurality of servers, databases, electronic devices, and users.

Server 910 includes a memory 912 and a processing unit 914. The memory 921 includes sound clips 916 and identifications 918 of the sound clips and other information discussed herein. The server 910 couples to or communicates with the database 920 that includes sound clips 922.

Electronic device 930 includes a processing unit 932 and memory 934 with sound clips 936 and identifications 938. User 939 interacts with or uses electronic device 930.

Electronic device 940 includes a processing unit 942 and memory 944 with sound clips 946 and identifications 948. User 949 interacts with or uses electronic device 930.

Figure 10:
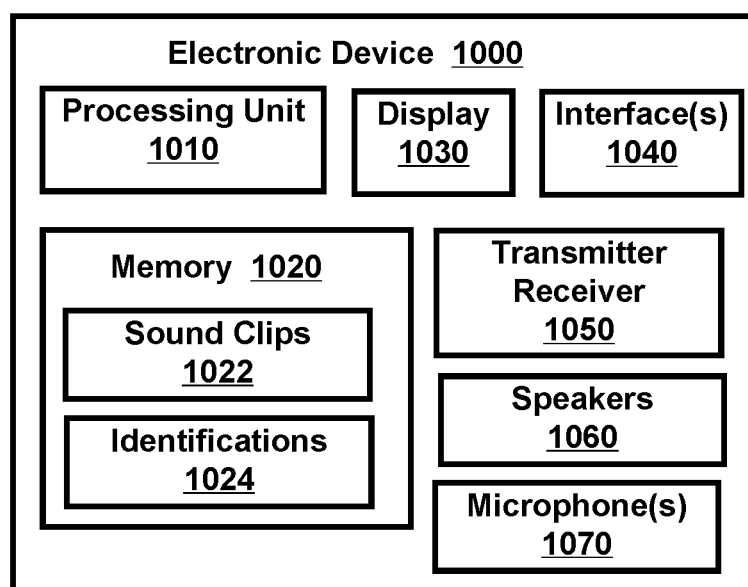
FIG. 10 is an electronic device in accordance with an example embodiment.

FIG. 10 shows an example of an electronic device 1000 in accordance with an example embodiment.

The electronic device 1000 includes a processor or processing unit 1010, memory 1020 with sound clips 1022 and identifications 1024, a display 1030, one or more interfaces 1040, a wireless transmitter/receiver 1050, speakers 1060, and one or more microphones 1070.

Memory includes computer readable medium (CRM). Examples of an interface include, but are not limited to, a network interface, a graphical user interface, a natural language user interface, a natural user interface, a phone control interface, a reality user interface, a kinetic user interface, a touchless user interface, an augmented reality user interface, and/or an interface that combines reality and virtuality.

The processor or processing unit includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, sound clips, algorithms (including software to implement or assist in implementing example embodiments) and other data.

For example, a processor or DSP executes a convolving process with the retrieved HRTFs or HRIRs (or other transfer functions or impulse responses) to process sound clips so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves and/or processes the sound captured at the microphones of an electronic device and provides this convolved sound to the listener so the listener can localize the sound and hear it. The listener can experience a resulting localization externally (such as at a sound localization point (SLP) associated with near field HRTFs and far field HRTFs) or internally (such as monaural sound or stereo sound).

The memory stores HRTFs, HRIRs, BRTFs, BRIRs, RTFs, RIRs, or other transfer functions and/or impulse responses for processing and/or convolving sound. The memory can also store instructions for executing one or more example embodiments. Further, the memory can store sound clips, identifications, SLI, and other information and instructions discussed herein.

The electronic device provides sound to the users through one or more speakers. Alternatively or in addition to the speakers, the electronic device can communicate with headphones, earphones, earbuds, bone conduction devices, or another electronic device that provides sound to the user.

The networks include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

By way of example, a computer and an electronic device include, but are not limited to, handheld portable electronic devices (HPEDs), wearable electronic glasses, electronic or smart watches, wearable electronic devices (WEDs), smart earphones or hearables, electronic devices with cellular or mobile phone capabilities or subscriber identification module (SIM) cards, desktop computers, servers, portable computers (such as tablet and notebook computers), smartphones, head mounted displays (HMDs), optical head mounted displays (OHMDs), headphones, and other electronic devices with a processor or processing unit, a memory, a DSP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Example embodiments can be executed with one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED (including headphones) includes a customized or dedicated DSP that executes one or more blocks discussed herein (including processing and/or convolving sound into binaural sound for sound clips). Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly correct errors while sound externally localizes to the user. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller. The DSP can also fetch identification information or SLI from lookup tables or memory discussed herein.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider another example in which sound clips, identifications, and/or HRTFs (or other transfer functions or impulse responses) are stored or cached in the DSP memory or local memory relatively close to the DSP to expedite binaural sound processing.

As used herein, "headphones" or "earphones" include a left and right over-ear ear cup, on-ear pad, or in-ear monitor (IEM) with one or more speakers or drivers for a left and a right ear of a wearer. The left and right cup, pad, or IEM may be connected with a band, connector, wire, or housing, or one or both cups, pads, or IEMs may operate wirelessly being unconnected to the other. The drivers may rest on, in, or around the ears of the wearer, or mounted near the ears without touching the ears.

As used herein, the word "proximate" means near. For example, binaural sound that externally localizes away from but proximate to a user localizes within three meters of the head of the user.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears or about six inches apart).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A method that expedites electronic communication between a first user with a first portable electronic device (PED) and a second user with a second PED, the method comprising:
   transmitting, from the first PED to the second PED, an identifier that identifies a binaural sound clip stored in memory of the second PED;
   retrieving, with the second PED, the binaural sound clip stored in the memory of the second PED and assigned to the identifier received from the first PED; and
   playing, with the second PED, the binaural sound clip in binaural sound such that sound from the binaural sound clip localizes in empty space to the second user.

2. The method of claim 1 further comprising:
   processing, with a digital signal processor (DSP) in the second PED and after receiving the identifier but before the second user requests to play the binaural sound clip, the binaural sound clip with a head-related transfer function (HRTF) to expedite playing of the binaural sound clip when a request to play the binaural sound clip is received at the second PED from the second user.

3. The method of claim 1, wherein the binaural sound clip externally localizes at least one meter away from a head of the second user at a virtual image of a graphical icon displayed to the second user with the second PED, and the second PED is one of augmented reality (AR) glasses or a head mounted display (HMD).

4. The method of claim 1 further comprising:
   receiving, at the first PED, selection of an emoji or an animoji that plays the binaural sound clip at the second PED to the second user,
   wherein the first PED transmits the identifier to the second PED without transmitting the emoji or the animoji in response to receiving the selection of the emoji or the animoji.

5. The method of claim 1 further comprising:
   expediting the electronic communication between the first user and the second user by transmitting the identifier of the binaural sound clip from the first PED to the second PED without transmitting the binaural sound clip from the first PED to the second PED.

6. The method of claim 1 further comprising:
   displaying, on the first PED and to the first user during the electronic communication, an icon that when activated by the second user plays the binaural sound to the second user during the electronic communication without transmitting the binaural sound clip to the second PED during the electronic communication.

7. The method of claim 1 further comprising:
   displaying, with the first PED, a three-dimensional (3D) emoji or 3D animoji; and
   receiving, at the first PED, activation of the 3D emoji or the 3D animoji that initiates transmission of the identifier from the first PED to the second PED without transmitting the binaural sound clip from the first PED to the second PED.

8. A method that plays sound clips in binaural sound between a first user with a first portable electronic device (PED) and a second user with a second PED, the method comprising:
   receiving, at the first PED from the first user, selection of a sound clip that will be played in the binaural sound at the second PED of the second user;
   transmitting, from the first PED to the second PED, an identifier that identifies the sound clip without transmitting the sound clip from the first PED to the second PED;
   retrieving, based on the identifier, the sound clip; and
   playing, by the second PED, the sound clip in the binaural sound such that sound from the sound clip externally localizes in empty space outside a head of the second user.

9. The method of claim 8 further comprising:
   displaying, on a display of the first PED, emojis that when selected cause the first PED to transmit identifiers of the sound clips to the second PED to enable the second PED to play the sound clips in the binaural sound to the second user without transmitting the sound clips between the first and second PEDs.

10. The method of claim 8 further comprising:
    expediting playing of the sound clip by processing the sound clip into the binaural sound with a processor at the second PED before the second user requests to play the sound clip.

11. The method of claim 8 further comprising:
    simultaneously displaying, on a display of the first PED, a plurality of graphical representations that when activated by the first user cause the first PED to transmit to the second PED identifiers associated with the graphical representations selected by the first user such that the second PED plays the binaural sound associated with the graphical representations selected by the first user without requiring the first PED to transmit the sounds clips to the second PED.

12. The method of claim 8 further comprising:
    displaying, with a display of the first PED, a graphical representation that when selected by the first user causes the first PED to transmit the identifier to the second PED without transmitting the sound clip of the graphical representation to the second PED.

13. The method of claim 8 further comprising:
    storing, in memory of the first PED, a list of unique identifications that each identify one of the sound clips that are stored in memory of the second PED and that can be played in the binaural sound to the second user; and
    associating different icons with each one of the sound clips and the unique identifications such that selection by the first user of one of the icons causes the first PED to transmit one of the unique identifications to the second PED so the second PED can identify which of the sound clips the first user is requesting to be played to the second user.

14. The method of claim 8 further comprising:
    storing, in memory of the second PED, a lookup table that includes a list of identifiers and a list of sound clips assigned to each one of the identifiers so that the second PED is able to identify and play the sound clips in the binaural sound requested by the first user upon receiving one of the identifiers from the first PED without receiving a sound clip from the first PED.

15. A portable electronic device (PED) of a first user that facilitates electronic communication with an electronic device of a second user, the PED comprising:
  a receiver that receives, from the electronic device of the second user, an identifier of a sound clip without receiving the sound clip from the electronic device of the second user;
  a memory that stores the sound clip; and
  a processor that retrieves the sound clip from the memory based on the identifier received from the electronic device of the second user and that plays the sound clip to the first user in binaural sound that externally localizes in empty space outside a head of the first user.

16. The PED of claim 15 further comprising:
  a display that displays an emoji that plays the sound clip when activated; and
  a transmitter that transmits the identifier to the electronic device of the second user without transmitting the sound clip upon receiving a request from the first user to play the sound clip at the electronic device of the second user.

17. The PED of claim 15, wherein the processor expedites playing of the sound clip by processing the sound clip with head-related transfer functions (HRTFs) after receiving the identifier from the electronic device of the second user but before receiving a request to play the sound clip from the first user.

18. The PED of claim 15, wherein the identifier is smaller in size than the sound clip, and processing time is reduced by enabling the first user to play the sound clip in the binaural sound by wirelessly receiving the identifier from the electronic device of the second user without wirelessly receiving the sound clip from the electronic device of the second user.

19. The PED of claim 15, wherein processing time of the processor is reduced since the sound clip is already stored in the memory before the PED receives a request from the first user to have the PED play the sound clip in the binaural sound to the first user, and the first and the second users do not have to wait for the sound clip to be transmitted over a wireless network and downloaded to the PED.

20. The PED of claim 15, wherein the PED includes electronic glasses and head mounted displays (HMDs), and the memory stores sound clips and a list of identifiers that identify the sound clips.

\* \* \* \* \*